United States Patent [19]

Hamstra et al.

[11] Patent Number: 4,530,088
[45] Date of Patent: Jul. 16, 1985

[54] GROUP CODING SYSTEM FOR SERIAL DATA TRANSMISSION

[75] Inventors: James R. Hamstra, Plymouth, Minn.; Robert K. Moulton, North Wales, Pa.

[73] Assignee: Sperry Corporation, New York, N.Y.

[21] Appl. No.: 580,391

[22] Filed: Feb. 15, 1984

Related U.S. Application Data

[63] Continuation of Ser. No. 466,768, Feb. 15, 1983, abandoned.

[51] Int. Cl.³ .................. H04J 3/12; H03K 13/00; H04L 3/00
[52] U.S. Cl. .................. 370/110.1; 375/37
[58] Field of Search ............ 370/110.1, 60, 94; 375/25, 37, 59, 75; 340/347 DD

[56] References Cited

U.S. PATENT DOCUMENTS

| | | | |
|---|---|---|---|
| 3,689,899 | 9/1972 | Franaszek | 340/172.5 |
| 3,701,144 | 10/1972 | Fineran et al. | 375/25 |
| 3,810,111 | 5/1974 | Patel | 340/172.5 |
| 4,063,220 | 12/1977 | Metcalfe et al. | 370/85 |
| 4,234,897 | 11/1980 | Miller | 360/45 |
| 4,345,325 | 8/1982 | Gandini et al. | 375/25 |
| 4,347,619 | 8/1982 | Dakin et al. | 375/37 |
| 4,366,572 | 12/1982 | Takatsuki et al. | 375/37 |

OTHER PUBLICATIONS

Horiguchi, T. and Morita, K., "An Optimization of Modulation Codes in Digital Recording," IEEE Transactions on Magnetics, vol. MAG-12, No. 6, Nov. 1976.

Primary Examiner—Douglas W. Olms
Assistant Examiner—Frank M. Scutch, III
Attorney, Agent, or Firm—Griffin, Branigan, & Butler

[57] ABSTRACT

A run-length-limited group coding system is provided wherein the code permits a high data transfer efficiency. Code values for both data and control functions are chosen such that the maximum cumulative DC deviation from a nominal center is no more than 10 percent averaged over a data transmission sequence. The code employed limits the maximum number of zero bits between successive one bits in a serial binary sequence to a predetermined value thereby permitting self-clocking. The coding system is particularly suitable for use in baseband data transmission systems where the transmission medium is either an electrical or optical link. Code values for control functions meet the same constraints as those for data and protocols are established such that the coding system may be integrated into a variety of multiple-unit system configurations wherein the communication between units is, for example, by way of a point-to-point link, or a bus, star, loop, or ring arrangement.

26 Claims, 19 Drawing Figures

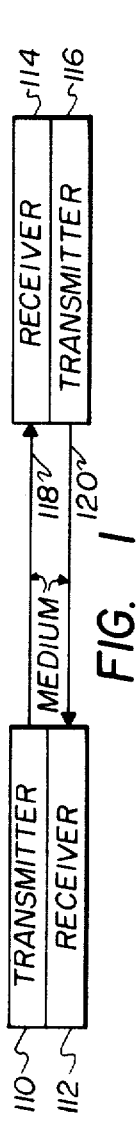
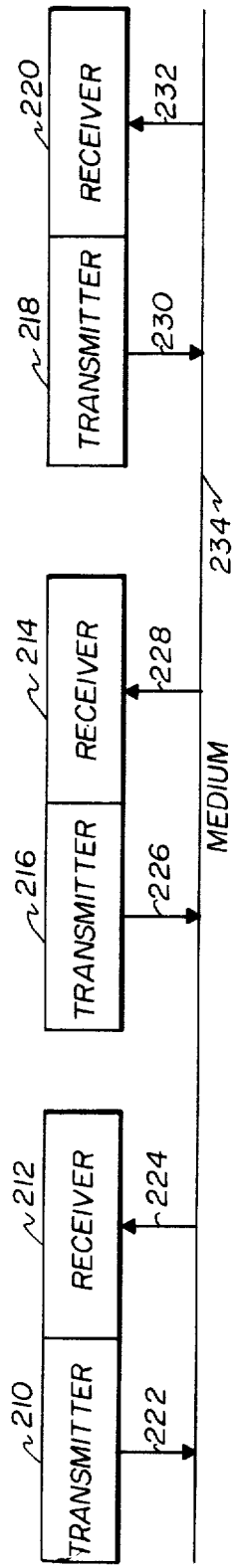
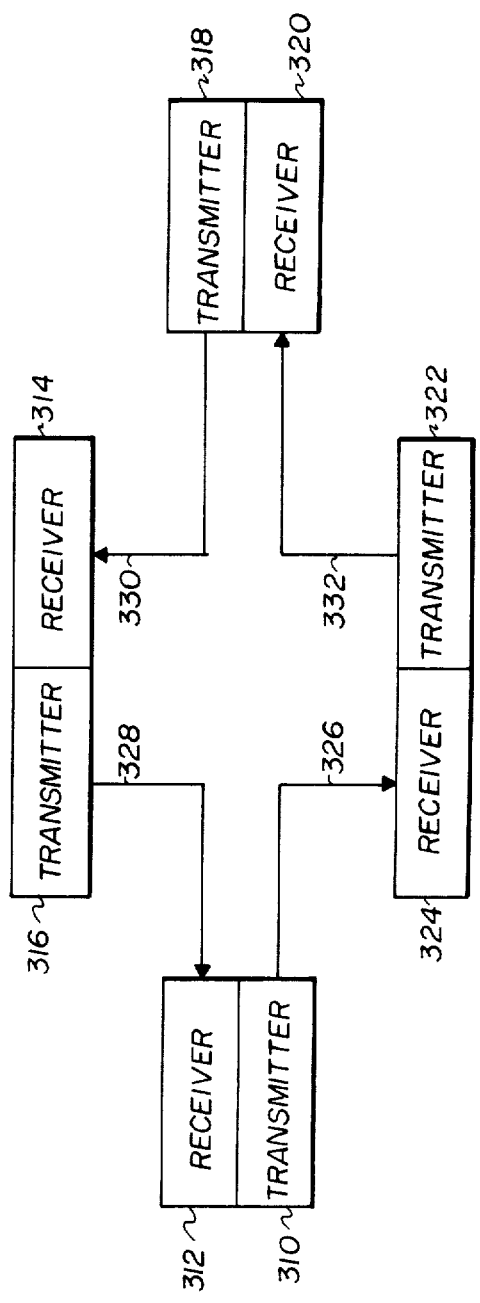

FIG. 6
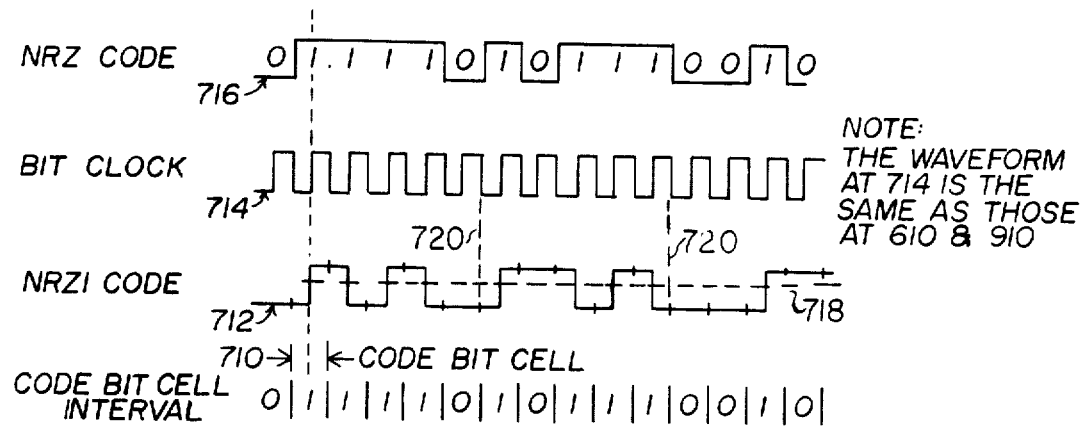
FIG. 7
FIG. 9

| CODE POINT | | WXYZ | NRZI WAVEFORM | OR NRZI WAVEFORM |
|---|---|---|---|---|
| DECIMAL | BINARY | | | |
| 0 0 | 0 0 0 0 0 | +50+ | | |
| 0 1 | 0 0 0 0 1 | +40- | | |
| 0 2 | 0 0 0 1 0 | +20- | | |
| 0 3 | 0 0 0 1 1 | +30+ | | |
| 0 4 | 0 0 1 0 0 | +00- | | |
| 0 5 | 0 0 1 0 1 | +10+ | | |
| 0 6 | 0 0 1 1 0 | +30+ | | |
| 0 7 | 0 0 1 1 1 | +20- | | |
| 0 8 | 0 1 0 0 0 | -20- | | |
| 0 9 | 0 1 0 0 1 | -10+ | | |
| 1 0 | 0 1 0 1 0 | +10+ | | |
| 1 1 | 0 1 0 1 1 | +00- | | |
| 1 2 | 0 1 1 0 0 | +30+ | | |
| 1 3 | 0 1 1 0 1 | +20- | | |
| 1 4 | 0 1 1 1 0 | +00- | | |
| 1 5 | 0 1 1 1 1 | +10+ | | |
| 1 6 | 1 0 0 0 0 | -40- | | |
| 1 7 | 1 0 0 0 1 | -30+ | | |
| 1 8 | 1 0 0 1 0 | -10+ | | |
| 1 9 | 1 0 0 1 1 | -20- | | |
| 2 0 | 1 0 1 0 0 | +10+ | | |
| 2 1 | 1 0 1 0 1 | +00- | | |
| 2 2 | 1 0 1 1 0 | -20- | | |
| 2 3 | 1 0 1 1 1 | -10+ | | |
| 2 4 | 1 1 0 0 0 | +30+ | | |
| 2 5 | 1 1 0 0 1 | +20- | | |
| 2 6 | 1 1 0 1 0 | +00- | | |
| 2 7 | 1 1 0 1 1 | +10+ | | |
| 2 8 | 1 1 1 0 0 | -20- | | |
| 2 9 | 1 1 1 0 1 | -10+ | | |
| 3 0 | 1 1 1 1 0 | +10+ | | |
| 3 1 | 1 1 1 1 1 | +00- | | |

FIG. 10

WXYZ FIGURE OF MERIT

W = WHICH DIRECTION DUTY CYCLE DEVIATES FROM NOMINAL
XY = DEVIATION FROM NOMINAL 50%
Z = CODE POINT PARITY

| WXYZ | CODE POINT DUTY CYCLE VIN = HIGH | VIN = LOW | CODE POINT - DECIMAL |
|---|---|---|---|
| +50+ | 100 | 0 | (00) |
| +50- | 100 | 0 | NONE |
| +40+ | 90 | 10 | NONE |
| +40- | 90 | 10 | (01) |
| +30+ | 80 | 20 | (03)(06)(12)(24) |
| +30- | 80 | 20 | NONE |
| +20+ | 70 | 30 | NONE |
| +20- | 70 | 30 | (02)(07)(13)(25) |
| +10+ | 60 | 40 | (05)(10)(15)(20)(27)(30) |
| +10- | 60 | 40 | NONE |
| +00+ | 50 | 50 | NONE |
| +00- | 50 | 50 | (04)(11)(14)(21)(26)(31) |
| -10+ | 40 | 60 | (09)(18)(23)(29) |
| -10- | 40 | 60 | NONE |
| -20+ | 30 | 70 | NONE |
| -20- | 30 | 70 | (08)(19)(22)(28) |
| -30+ | 20 | 80 | (17) |
| -30- | 20 | 80 | NONE |
| -40+ | 10 | 90 | NONE |
| -40- | 10 | 90 | (16) |
| -50+ | 0 | 100 | NONE |
| -50- | 0 | 100 | NONE |

FIG. 11

| CODE POINT | | | |
|---|---|---|---|
| DECIMAL | BINARY* | SYMBOL | ASSIGNMENT |

|  |  |  | LINE STATES |
|---|---|---|---|
| 00 | 00000 | Q | QUIET (INACTIVE) |
| 04 | 00100 | H | HALT (FORCED BREAK) |
| 31 | 11111 | I | IDLE |

|  |  |  | STARTING DELIMITER |
|---|---|---|---|
| 24 | 11000 | J | 1ST OF SEQUENTIAL SD PAIR |
| 17 | 10001 | K | 2ND OF SEQUENTIAL SD PAIR |

DATA QUARTETS

| DECIMAL | BINARY* | SYMBOL | HEX | BINARY |
|---|---|---|---|---|
| 21 | 10101 | 0 | 0 | 0000 |
| 22 | 10110 | 1 | 1 | 0001 |
| 30 | 11110 | 2 | 2 | 0010 |
| 14 | 01110 | 3 | 3 | 0011 |
| 11 | 01011 | 4 | 4 | 0100 |
| 26 | 11010 | 5 | 5 | 0101 |
| 15 | 01111 | 6 | 6 | 0110 |
| 28 | 11100 | 7 | 7 | 0111 |
| 10 | 01010 | 8 | 8 | 1000 |
| 27 | 11011 | 9 | 9 | 1001 |
| 23 | 10111 | A | A | 1010 |
| 18 | 10010 | B | B | 1011 |
| 09 | 01001 | C | C | 1100 |
| 20 | 10100 | D | D | 1101 |
| 29 | 11101 | E | E | 1110 |
| 19 | 10011 | F | F | 1111 |

FIG. 12A

| CODE POINT | | | |
|---|---|---|---|
| DECIMAL | BINARY* | SYMBOL | ASSIGNMENT |
| | | | ENDING DELIMITER |
| 13 | 01101 | T | USED TO TERMINATE DATA STREAM |
| | | | |
| | | | CONTROL INDICATORS |
| 07 | 00111 | R | DENOTING LOGICAL "0" (RESET) |
| 25 | 11001 | S | DENOTING LOGICAL "1" (SET) |
| | | | |
| | | | INVALID CODE POINTS |
| 01 | 00001 | V | THESE CODE POINTS ARE |
| 02 | 00010 | V | NOT USED BECAUSE THEY |
| 03 | 00011 | V | VIOLATE CONSECUTIVE ZERO |
| 05 | 00101 | V | BIT OR DUTY CYCLE |
| 06 | 00110 | V | LIMITS. (VIOLATION) |
| 08 | 01000 | V | |
| 12 | 01100 | V | |
| 16 | 10000 | V | |

(12345) = SEQUENTIAL ORDER OF BIT TRANSMISSION

* NOTE: A CODE "1" REPRESENTS A TRANSITION, AND A CODE "0" REPRESENTS A LACK OF TRANSITION (NRZI FORMAT).

FIG. 12B

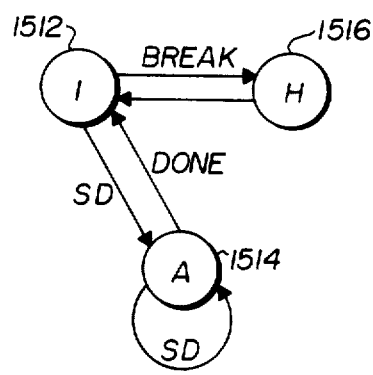
FIG. 15
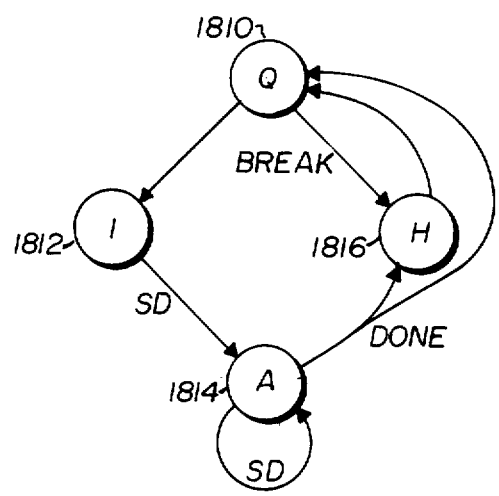
FIG. 18
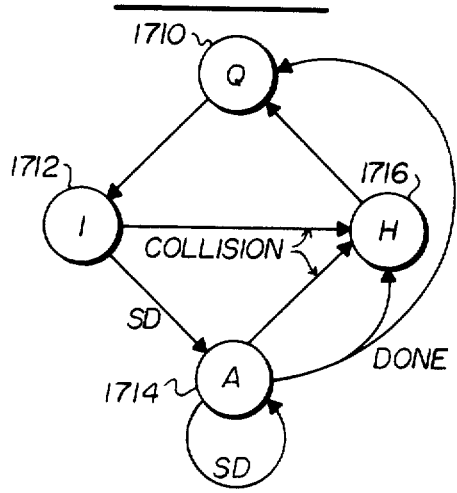
FIG. 17
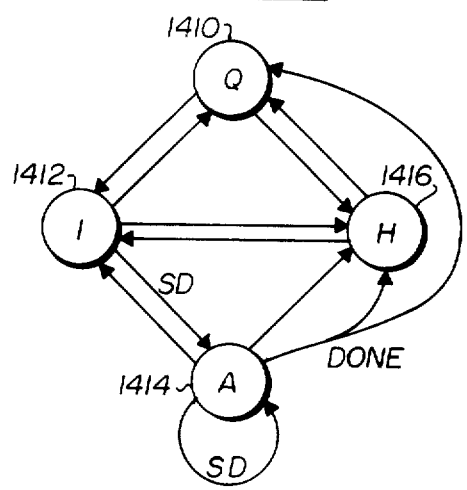
FIG. 14
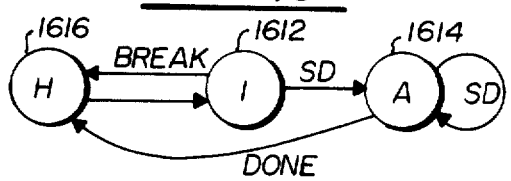
FIG. 16
FIG. 13

GROUP CODING SYSTEM FOR SERIAL DATA TRANSMISSION

RELATED APPLICATIONS

This application is a continuation of application Ser. No. 466,768 filed Feb. 15, 1983, now abandoned.

BACKGROUND OF THE INVENTION

A. Field of the Invention

This invention relates to a medium-independent system for encoding/decoding binary data and control signals serially transmitted between two or more communicating stations and is suitable for use in both local and long haul data communication systems. More particularly, this invention relates to a run-bounded or run-length-limited, self-clocking coding system which may be used in local or long haul networks or in other data communication environments and is well adapted to baseband transmission on a variety of physical media, including fiber optics, coaxial cables and twisted pairs, and may be employed in a wide variety of systems where stations are interconnected point-to-point, or by way of a bus, star, loop or ring.

B. Prior Art

Run-length-limited group codes are well known and the characteristics of several of them are described in the *IEEE Transactions on Magnetics,* Vol. MAG-12, No. 6, Nov. 1976, at pages 740–742. While much work has been done to optimize such codes for use in magnetic recording systems, comparatively little work has been done to optimize such codes for use in high speed serialized data communications systems where the optimum characteristics of a code are different.

Run-length-limited codes are designed to exhibit various preferred characteristics depending on the environment in which the code is utilized. The codes are usually constrained such that an encoded sequence of signals can have no more than k consecutive binary zeros between two successive binary ones, and must have at least d binary zeros between consecutive binary ones. By limiting the value of d, the codes are made self-clocking. That is, the signal transitions between the zeros and ones can be utilized at a receiving station to derive or recover a clock signal from the stream of data bits.

Among the known codes is what is termed the 4/5-rate NRZI code in which a symbol in a first code of m=4 binary bits is encoded into a second code of n=5 binary bits, the signals of the second code being in the Non-Return To Zero-Invert on ones (NRZI) format.

The ratio m/n is a measure of the coding efficiency and is especially important in serial communications systems because it determines the data transfer rate. For example, in a serial system where the rate of occurrence of the binary bits in the second code is 125 megabits/sec., if the coding efficiency is m/n=0.5 then the effective rate of data transfer in the first code is reduced to 62.5 megabits/sec.

Another factor to be considered when designing a code for serial data transmission is the maximum cumulative DC component placed on the transmission medium by a sequence of signals. Because the stations of a high speed data transmission system are usually separated by non-trivial distances it is not practical to provide a common ground. Therefore, in balanced transmission systems with AC coupling signalling is accomplished by shifting the signal level by equal amounts above or below some nominal level as a manifestation of the encoded binary bits. Ideally, the maximum DC component is zero. That is, over a given interval the magnitude of the signal averages out to a value equal to the nominal value. Some codes yield a maximum DC component of zero. For example, in the Manchester code each binary bit is represented by a signal level which is above the nominal level for one cell interval and below the nominal level for a second cell interval, the relative phases of the two levels representing a binary zero or one. A "cell" is the interval of time required to signal one bit of encoded data and since a cell in the Manchester code is equal to twice the interval required to signal an uncoded binary bit, the coding efficiency m/n is only 50%.

Other codes such as the straight NRZ and NRZI codes provide 100% coding efficiency but are unsuitable for serial high speed data communications systems because they permit a large cumulative DC deviation and because the number of zeros between consecutive ones is not limited thereby prohibiting self-clocking. The self-clocking deficiency of the NRZI code may be overcome by inserting a data bit or transition from one signal level to the other at predetermined intervals if a transition has not occurred in the stream of data bits. However, this insertion results in a variable data rate with a reduced (and variable) coding efficiency.

A further consideration in the design and selection of a code is the complexity of the circuitry required to implement the encoding and decoding functions.

Table I summarizes the data rate, coding efficiency, maximum cumulative DC deviation and maximum transition interval d for several codes. From Table I and the foregoing discussion it is evident that there must be some balancing of the various code requirements of coding efficiency, maximum cumulative DC deviation, circuit complexity and self-clocking capability in order to obtain a suitable code meeting the requirements of a given system design.

TABLE I

| Code Type | Date Rate (Megabit/Sec) | Coding Efficiency | Maximum Cumulative DC Deviation | Maximum Transition Interval (Code Cells) |
|---|---|---|---|---|
| NRZ | 125 | 100% | 50% | No Limit |
| NRZI | 125 | 100% | 50% | No Limit |
| Bit Insertion | 93.75 to 125 | 75 to 100% | 30% | 3 |
| Manchester | 62.5 | 50% | 0% | 1 |
| Group Code(4/5)* | 100 | 80% | 10% | 3 |

*Subject of present invention

It has been determined that most high speed serial data transmission systems can function quite well with minimum degradation of receiver performance if the cumulative DC deviation averaged over the transmission interval does not exceed 10% of the nominal level. The present invention provides a code which not only meets this criterion but also has a high code efficiency and a self-clocking capability and can be readily implemented by circuits of simple design.

As previously stated, many codes of the prior art have been developed specifically for magnetic recording systems where function codes are not considered, and the codes which have been used in high speed serial transmission systems have not taken into account the effect of function or control signals, that is, the signals which change the activity state of the system. The present invention provides a code wherein data signalling and most function or control signalling conforms to the same constraints so that the coding efficiency is not diminished, the maximum cumulative DC deviation does not exceed 10% when averaged over a transmission, and the control and data codes are self-clocking.

BRIEF DESCRIPTION OF THE INVENTION

An object of this invention is to provide an improved media independent system for encoding and decoding binary data for serial transmission.

An object of this invention is to provide a run-bounded self-clocking coding system for serial interfaces which may be used in both local and long haul networks.

A further object of this invention is to provide a high efficiency group encoding technique for a serial data transmission system which insures that the maximum cumulative DC deviation from nominal center of the transmitted signal does not exceed 10% averaged over the transmission interval.

Another object of the invention is to provide a data transmission system wherein all data and most function control signals are encoded into a self-clocking coded signal sequence exhibiting a high coding efficiency and a low cumulative DC deviation from a nominal level.

Another object of the invention is to provide an encoding and decoding system as described above which is simple in construction and requires a relatively small number of components.

A further object of this invention is to provide an encoding/decoding system as described above which is suitable for use in both local and long haul data communication systems where multiple stations are interconnected point-to-point or by a bus, or in a star, loop or ring configuration.

The above-stated objects of the invention are achieved in a preferred embodiment by providing at each transmitter an encoder which encodes each 4 bits of data in a first code into 5 bits of data in a second code. Of the thirty-two different code values in the second code only sixteen are assigned as data code values and these values are chosen such that there can never be more than three binary zeros between successive ones in the encoded data stream thereby assuring signal transitions at intervals sufficiently close to permit clock recovery from the data stream. Of the sixteen remaining code values of the second group, certain ones are utilized to represent control functions. System protocols are established such that a stream of encoded signals representing both data and control functions normally has no more than three zeros between successive ones, and the cumulative DC deviation on the transmission medium never exceeds 10 percent of a nominal level when averaged over the transmission interval. the only exceptions being a Halt code and a Quiet code which by their nature halt transmission on the medium or signal the absence of AC switching on the medium. Each encoder includes a multiplexer for gating data or control codes in the first code to the addressing inputs of a ROM. The ROM stores different code values for the second code and as the ROM is addressed the code values are read from the ROM, serialized, and converted from NRZ to NRZI format before being applied to the transmission medium.

Each receiver includes a decoder which converts the received signals back to NRZ format. The NRZ signals are shifted into a serial shift register. Output signals in an $n=5$ bit binary code are read from the register and applied as addresses to a ROM which stores the code values for the first ($m=4$) code. The decoded values are then read from the ROM. In addition to a clock recovery means, each decoder also includes means for detecting predetermined sequences of signals representing the state of the transmission medium and the detecting means produces signals to control the decoder circuits and the receiver circuits. A gating circuit rather than a ROM may be used in the encoder and/or decoder for performing the encoding and/or decoding function.

Other objects of the invention and its mode of operation will be more readily understood upon consideration of the following description and the accompanying drawings.

BRIEF DESCRIPTION OF THE DRAWINGS

FIG. 1 is a simplified block diagram of a full duplex point-to-point data communication system;

FIG. 2 is a simplified block diagram of a bus communication system;

FIG. 3 is a simplified block diagram of a loop or ring communication system;

FIG. 6 is a timing diagram illustrating the timing of signals occuring in the encoder of FIG. 5;

FIG. 7 is a timing diagram illustrating the bit clock as well as the waveforms for NRZ and NRZI signal sequence;

FIG. 9 is a timing diagram illustrating the timing of signals occuring in the decoder of FIG. 8;

FIG. 10 illustrates the available code points in an $m=5$ code and the two possible NRZI waveforms for each code point;

FIG. 11 is a table summarizing WXYZ for each code point, WXYZ being a figure of merit used for evaluating code point assignment;

FIGS. 12A and 12B comprise a table showing the preferred code point assignments used in the preferred embodiment of the invention;

FIG. 13 is a waveform diagram illustrating waveforms on the transmission medium which define certain states of the system;

FIG. 14 is a state diagram showing the various states of a receiver of this system;

FIG. 15 is a state diagram for a transmitter of this system illustrating the various states of a full duplex point-to-point system, or a closed loop clocking ring network;

FIG. 16 is a state diagram illustrating the various states of an open loop clocking ring network;

FIG. 17 is a state diagram of a transmitter which illustrates the various states of a bus contention system; and, FIG. 18 is a state diagram of a transmitter illustrating the various states of a bus system of the explicit or implicit token type.

DETAILED DESCRIPTION OF THE INVENTION

Typical Communicating Station

Figure 4:
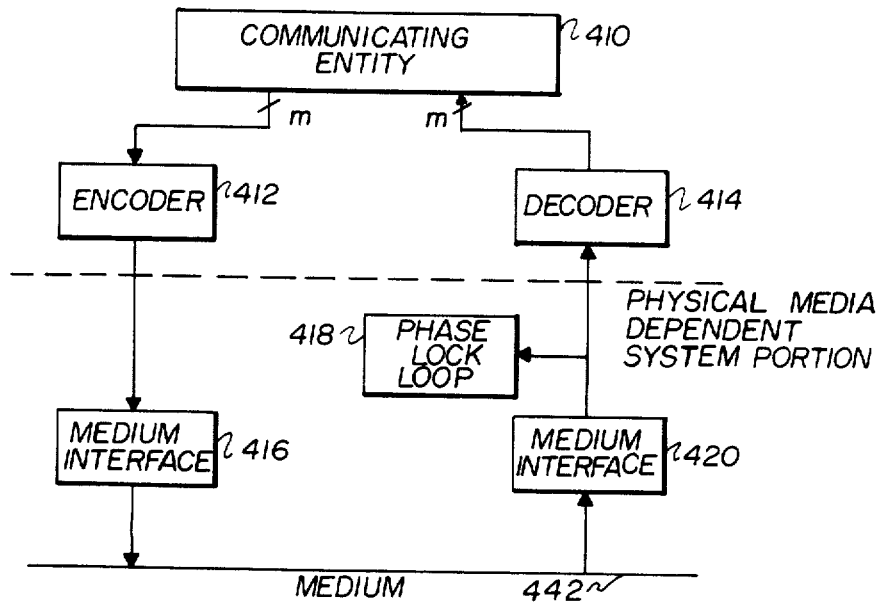
FIG. 4 is a simplified block diagram illustrating a station for receiving signals from, or applying signals to a signal transmission medium.

FIG. 4 illustrates one "station" forming part of a serial data communication system. The station includes a communicating entity 410 which may comprise a transmitter, a receiver, or both a transmitter and receiver, as is conventional in the art. The communicating entity 410 is connected to receive signals from a transmission medium 442 through a medium interface 420 and a decoder 414 and is connected to apply signals to the transmission medium through an encoder 412 and a medium interface 416.

The medium interfaces 416 and 420 are of conventional design and are for the purpose of converting signals on the medium to a form or level in which they may be processed by the station. For example, if medium 442 is an optical link then the interfaces 416 and 420 will include electro-optical converters.

The decoder 414 is subsequently described in detail and decodes bit-serial signals from the transmission medium into the code in which they were generated by another communicating entity. The encoder 412 encodes data and control signals generated by the communicating entity into a bit-serial code suitable for transmission over the medium 442 to another communicating entity. A phase locked loop 418 of conventional design is employed to derive a clock signal from the serial data stream passing through the interface 420.

FIG. 4 shows a station wherein the communicating entity includes both a transmitter and a receiver. Obviously, each station need not include all of the elements shown in FIG. 4. For example, encoder 412 and medium interface 416 would not be required where the communicating entity includes only a receiver.

Multiple stations like that shown in FIG. 4 may be interconnected in a variety of system configurations as illustrated by the full duplex point to point system shown in FIG. 1, the bus system shown in FIG. 2, or the ring network shown in FIG. 3.

Encoder

The major difference between group codes and other prior art codes is in the ability of these codes to interpret larger data blocks than the usual bit-by-bit encoding techniques used in other self-clocking coding systems such as the differential Manchester code. In a preferred embodiment of the present invention a fixed sequence, or block of $m=4$ data or function control bits (a data group) is coded into a fixed sequence, or block of $n=5$ code bits (a code group). As used herein, the term data is intended to encompass not only the binary information data but also binary header fields, address fields, information fields, frame check fields, etc. as may be required in a specific application or system configuration.

All group codes use the same general design concepts, differing in the lengths of the blocks and in the assignment of specific code group values (i.e. patterns or sequences of bits) to denote each distinct data group value and to denote other distinct transmission control information. The unique code group values are frequently referred to as "code points". There are $2^n$ possible code points in a group code of block length n hence for the preferred embodiment of the invention hereinafter described there are $2^5 = 32$ code points. These code points and their binary and decimal equivalents are shown in FIG. 10.

Where $m=4$, there are 16 possible combinations of binary bits in a group of four bits. Each of these combinations is referred to as a "data quartet" and the binary and hexadecimal values of each of these quartets is set forth in FIG. 12A. Since there are a maximum of 16 quartets in the first code and there are 32 code points in the second code, all code points in the second code are not utilized. According to one aspect of the present invention the code points utilized to represent data quartets and control codes are selected according to certain criteria which will be discussed after the system structure has been described.

Figure 5:
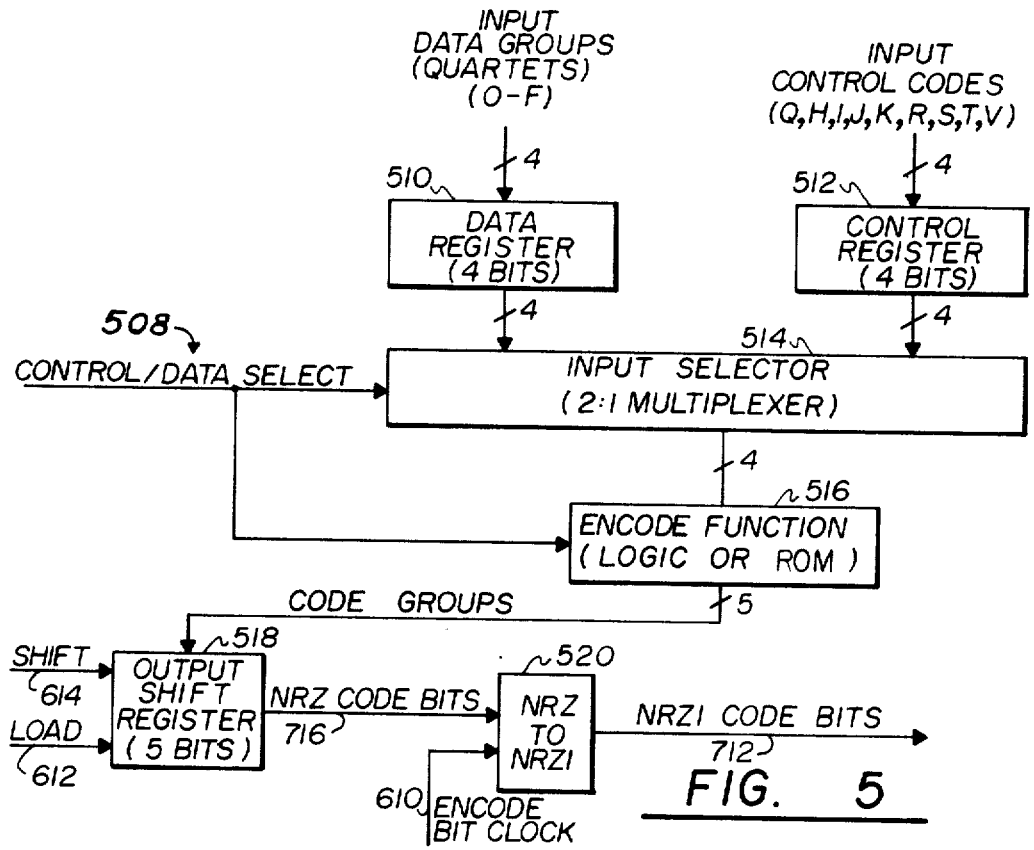
FIG. 5 is a simplified block diagram of an encoder structure constructed in accordance with the principles of the present invention.

FIG. 5 illustrates an encoder constructed in accordance with the principles of the present invention. It comprises a first register 510, a second register 512, a selector or multiplexer 514, an encoding means 516, a shift register 518 and a converter 520. The encoder of FIG. 5 is associated with a communicating entity 410 which generates data groups or quartets, function control codes and a signal indicating whether its output represents a data group or a function control code. The data groups and function control codes each comprise 4 binary bits and they are applied to the registers 510 and 512. With each data group or function control code the communicating entity produces a signal on lead 508 indicating whether a data group or function control code is simultaneously being presented to the encoder.

The signal on lead 508 activates selector 514 so that a data quartet from register 510 or a control code from register 512 is gated through the selector to the inputs of the encoding means 516. The encoding means may comprise a Read Only Memory (ROM) a gated logic array, or any other suitable means for converting or translating a four-bit input code to a five-bit output code. Assuming that encoding means 516 is a ROM, the output signals from the selector 514 and the signal on lead 508 comprise an address capable of reading out a stored code group from any one of 32 locations in the memory. However, since in a preferred embodiment there are only 16 possible data quartets and only 9 function control codes, the ROM stores only 25 five-bit code groups. This requires 5 addressing signals. Since the data and control codes are all four bits, the signal on lead 508 distinguishes control codes from data codes.

Each code group read from the encoding means 516 is applied in parallel to the 5-bit shift register 518 and is loaded therein upon occurrence of a Load signal. The Load signal is generated by the communicating entity 410 and occurs simultaneously with every fifth encode bit clock pulse generated by the communicating entity as illustrated by waveforms 610 and 612 in FIG. 6. The communicating entity also generates a sequence of Shift signals which are applied to register 518 to shift its contents to the right. A Shift signal is generated simultaneous with each encode bit clock pulse occuring in the intervals between Load pulses the Shift signal waveform being illustrated by waveform 614 in FIG. 6.

The output of the right-most stage of register 518 is applied to converter 520 and, because of the sequences of Load and Shift signals applied to the register the code signals appearing on lead 716 are in the Non-Return-To-Zero (NRZ) format. A sequence of signals in the NRZ format is illustrated by waveform 716 in FIG. 7.

The NRZ output of register 518 is converted by converter 520 to Non-Return-To-Zero-Invert-on-ones format (NRZI) wherein the signal level shifts between first and second levels each time a binary one occurs as illustrated by waveform 712. The resulting NRZI code sequence is applied from converter 520 through a medium interface 416 (FIG. 4) to the transmission medium 442.

The NRZI code placed on transmission medium 442 is transmitted to one or more stations depending upon the system configuration, that is, depending upon whether the stations are interconnected point-to-point, or in a ring, loop or star configuration.

DECODER

Signals placed on the transmission medium 442 by the medium interface 416 of a transmitting station (FIG. 4) are received by one or more receiving stations connected to the transmission medium. At each receiving station the signals are applied to a medium interface 420 where certain conversions (e.g. optical to electrical) may occur. The resulting electrical signals are applied to a clock recovery circuit 418 and to a decoder 414 which converts the NRZI code groups back to 4-bit binary code groups.

Figure 8:
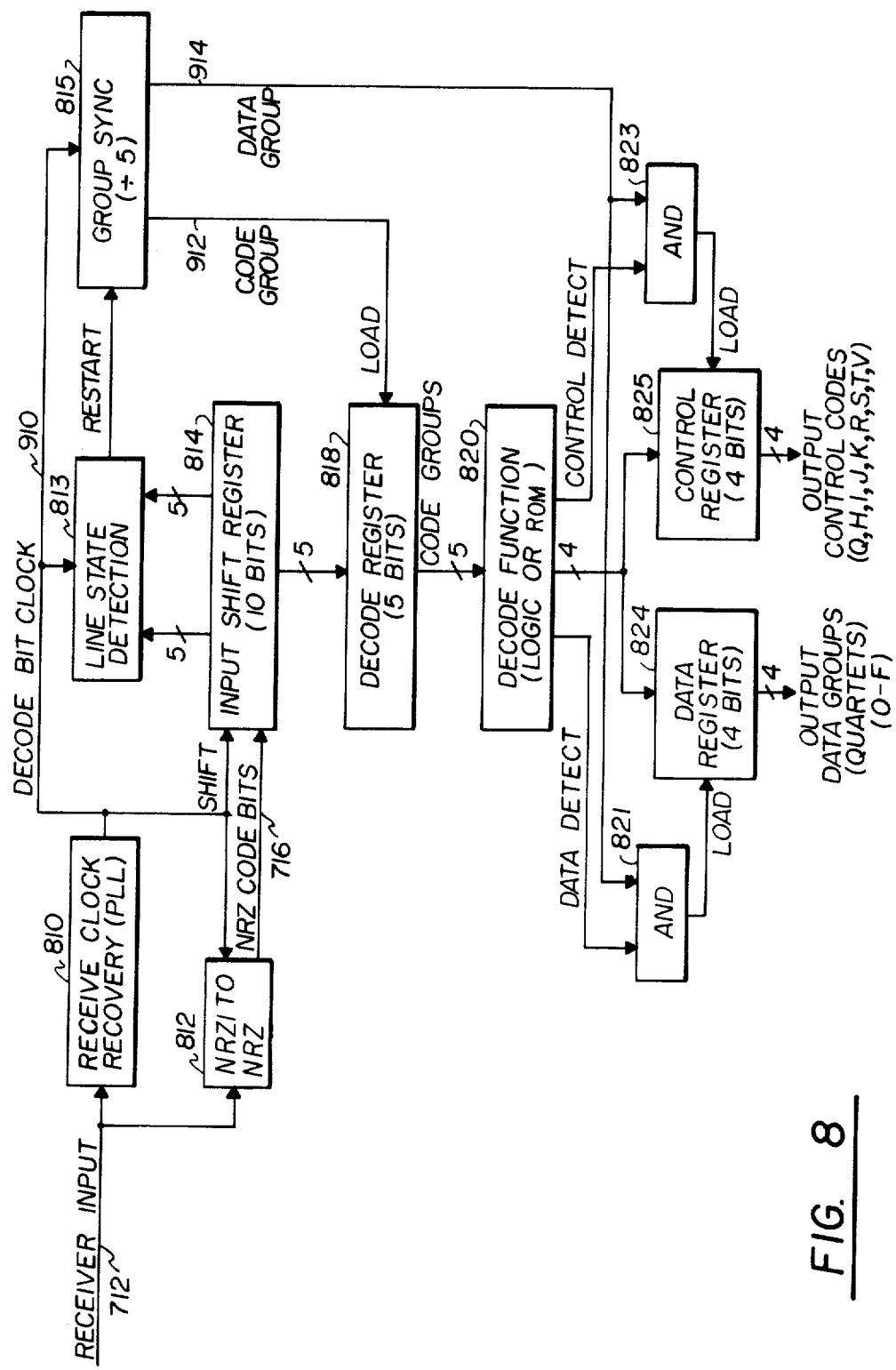
FIG. 8 is a simplified block diagram of a decoder structure constructed in accordance with the principles of the present invention.

The clock recovery circuit 418 is illustrated in FIG. 8 as a receive clock recovery circuit 810 which may be of conventional design. It utilizes the signal level transitions of the received NRZI encoded data to derive a decode bit clock synchronized to the encoded data. The remaining elements of FIG. 8 comprise the decoder 414.

The decoder comprises an NRZI to NRZ converter 812, a 10-bit shift register 814, a 5-bit register 818, a decoding means 820, a pair of AND gates 821 and 823, a data register 824 a control register 825, a line state detector 813 and code group sync logic 815. Signals from the transmission medium 442 are operated on by the medium interface 420 to convert the signals to a form suitable for input to the decoder of FIG. 8 and the resulting signals are applied to the clock recovery circuit 810 and the converter 812.

The converter 812 is of conventional design and produces at its output in NRZ format a waveform representing the incoming signals applied to its input. The output of the converter 812 is applied to the first stage of the shift register 814.

The clock recovery circuit responds to the incoming signals by generating a train of decode bit clock pulses as illustrated by waveform 910 in FIG. 9. The clock pulses are applied to the shift register 814 to load therein the time sequential output signals from converter 812.

The ten stages of shift register 814 are connected to the line state detection circuit 813. The line state detection circuit also receives the decode bit clock pulses and in response to each of these pulses it senses the contents of shift register 814. The purpose of the line state detection circuit is to detect those specific control codes, which can occur on arbitrary code bit boundaries independent of code group synchronization, as later described. Upon detection of a certain control code (Start Delimiter) the circuit 813 produces an output signal to reset or restart the code group sync logic 815.

The code group sync logic 815 includes a modulo-5 counter which is incremented by one in response to each decode bit clock pulse. The counter produces a code group signal on lead 912 and a data group signal on lead 914 each time it is cycled, the data group signal occurring four encode bit clock intervals after the code group signal as shown in FIG. 9.

The code group signals produced by logic 815 are applied to register 818 which receives in parallel the outputs of the five rightmost stages of shift register 814. In response to each code group signal the register 818 is loaded with the outputs from these stages.

The outputs of decode register 818 are applied to the decoding means 820 which may be either a ROM or a logic circuit. In either case the decoding means decodes the output signals from the register 818 back into the form in which they were applied to the encoding means 516. Assuming that decoding means 820 is a ROM, the outputs from register 818 address the ROM to read out the decoded value. In addition to storing the decode values, the ROM includes at each location an indicator which provides an indication as to whether the location stores the decoded value for a data quartet or a control function code. The 4-bit decoded values read from the ROM are applied to both the data register 824 and the control register 825. The indicators read out of the ROM with the decoded values are applied to AND gates 821 and 823 which are further enabled by the data group signals from the logic 815. The outputs from AND gates 821 and 823 enable the loading of the data register 824 and the control register 825, respectively. Therefore, depending upon whether the indicator read out of the ROM with a decoded value indicates a data quartet or a control function code, the decoded value is loaded into the register 824 or register 825, respectively.

The outputs of registers 824 and 825 are applied to a receiving communicating entity 410 (FIG. 4) where the data and control codes are processed by conventional means. In a loop or ring, this processing may involve re-encoding the outputs of registers 824 and 825 so that the data quartets and control codes are "repeated" or passed on to the next station.

Selecting The Code Values

Referring for the moment to FIG. 7, the horizontal line 718 represents a desired or nominal level of DC component which should be produced by a sequence of NRZI signals. Assuming that the height of each pulse in the waveform 712 is V, so that the signal shifts between $+\frac{1}{2}$ V and $-\frac{1}{2}$ V, the nominal or desired cumulative DC component over a given time period is at the mid-height of V or zero volts. This nominal level occurs only if the signal is at $+\frac{1}{2}$ V and $-\frac{1}{2}$ V for equal intervals of time over the time period. Considering the code group 10111 (see waveform 716) the average value of the signal level for the coded NRZI signal (waveform 712) measured over the code group time interval delineated by vertical lines 720 is +0.55 V. Therefore the DC deviation of the code group is +0.05 V and the precent DC deviation from nominal is 0.05 V/0.5 V or 10%. Note that if the code group 10111 were preceded by a "1" rather than a zero as illustrated in FIG. 7 then the NRZI waveform for the code group would be inverted and the DC deviation from the nominal level would be −10%.

A novel aspect of the present invention relates to the selection of the specific code values stored in (or generated by) the encoding means 516 and the decoding means 820. As previously explained, when encoding a 4-bit code into a 5-bit code there are 32 possible values or combinations of binary bits in the second code which may be selected to represent the 16 possible values of the first code. The values which are chosen affect not only the self-clocking capability of the system but also the maximum DC deviation from the nominal level. The values are chosen so that there are at least two signal transitions in the waveform which represent each value and that no more than three consecutive zeros can occur between consecutive ones during any valid data field sequence. This insures a satisfactory self-clocking capability for the code. The values are also chosen such that the maximum deviation of the DC component from the nominal level does not exceed 10% averaged over a transmission sequence. As previously noted, the values chosen to represent the Quiet and Halt codes do not conform to both of these constraints.

FIG. 10 shows, for each of the 32 possible values or code points in a 5-bit code, the equivalent decimal value, the code point value in binary, a figure of merit WXYZ and the two possible waveforms for the NRZI signal representing the code group. The left-most column of NRZI waveforms occur when the particular waveform is preceded by a waveform which ends at the low level ($-\frac{1}{2}$ V) and the right-most column of NRZI waveforms occur when the particular waveform is preceded by a waveform which ends at the high value ($+\frac{1}{2}$ V).

The figure of merit WXYZ provides an indication of the duty cycle for each code point. In the figure of merit, W represents the direction of DC component variation from the nominal level for the code point. A W of + indicates that the waveform for the code point remains in the same voltage polarity as in the beginning of the group over the majority of the code point interval while a W of — indicates that the waveform remains in the opposite polarity over a majority of the code point interval.

XY represents the magnitude (not percentage) of the DC component deviation from the nominal level. When the magnitude of the DC component deviation is added to or subtracted from the nominal level, depending upon whether W is + or —, respectively, it gives an indication of the duty cycle for the code point. For example, if the magnitude of the deviation of a code point is 50 (i.e. 50% of V) this value is summed with 50 (the nominal level is 50% of V) taking into account the polarity of W. If W is + then the summation yields a duty cycle of 100%. This is illustrated by the top right-most NRZI waveform in FIG. 10 and the top line, second column of the table of FIG. 11 and assumes that the preceding code point terminated at the high level. If the preceding code point terminated at the low level then the duty cycle is 100−(WXY+nominal) or zero as represented by the top left-most waveform in FIG. 10 and the top line, third column of FIG. 11. FIG. 11 shows, for each code point (Col. 4) the figure of merit (Col. 1) as well as the duty cycle when the preceding code point ended at the high level (Col. 2) or the low level (Col. 3).

Z in the figure of merit is an indication of the parity of the associated code point. Z= — if there are an odd number of ones (transitions) in the waveform for the code point and Z is + if there are an even number of ones. Therefore, any code point with an even parity (Z= +) ends at the same voltage level at which it begins while a code point with an odd parity ends at the opposite level from that at which it began.

Any sequence of code points can be evaluated with respect to duty cycle to thereby determine the DC component variation with respect to the nominal level. This can be done by combining the WXY terms for the code points in the sequence (noting that the WXY term for any code point is inverted if the preceding code point parity was odd) and dividing the result by the number of code points in the sequence. From the foregoing, the following observations may be made:

(a) Equivalent "Z" and "W" terms for consecutive code points indicate that the DC components interact in the same direciton such that a −WYZ code pattern (e.g. −10+), preceded by a WXY− code pattern (e.g. +20− ), will result in a mathematically averaged DC component variation (e.g. +15%) around nominal over these two code patterns.

(b) Opposite "Z" and "W" terms indicate that the DC components interact in the opposite direction such that a +XYZ code pattern (e.g. +10−), preceded by a WXY− code pattern (e.g. +20−), contributes in the opposite direction, so as to achieve an average DC component (e.g. +5%) over these two code patterns.

(c) Any combination of sequential −10+, and +00−codes will result in a maximum of a 10% DC component deviation from nominal over these sequential code patterns.

(d) Any code point having odd parity (Z= −) if repeated, results in a 0% DC component variation from nominal over the interval of the sequential code point pair. For example, a −20− pattern followed by any −20− pattern result in 0% DC component over the sequential code group pair. A +30+ pattern followed by a −30+ pattern results in a 0% DC component over the sequential code group pair.

It is assumed that the RC time constant associated with the medium interface circuitry 416 and 420 is sufficiently large so as to (1) be minimally impacted by the effects of a single valid code point such as a +30+ pattern, and also (2) to be minimally impacted by three consecutive zero code bits. As a practical matter this RC time constant can be approximated to be fifty (50) times the bit clock signal although this will depend on specific application parameters.

Using the foregoing observations, the assignment of code points in the 5-bit code is made in the following manner.

DATA QUARTETS Data quartets are used to transmit variable length media-transparent binary data. For the purposes of this invention, media-transparent data is defined as the entire binary data contents of a transmission including header fields, address fields, information fields, frame check fields, etc. as appropriate to an individual application. Data quartets are detected in Data Register 824 after the code group boundary is established by the Starting Delimiter sequence described below.

Data quartets are assumed to be arbitrary in distribution where any data quartet can be followed by any other data quartet. To satisfy the limitation of a maximum interval between transitions of three code cells provided by this invention, only code points with one (maximum) leading code zero and with two (maximum) trailing code zeros are allowed. Thus, assignment of data quartets to code points, as shown in FIG. 12A is as follows:

(a) Code points 09, 10, 11, 14, 15, 18, 20, 21, 23, 26, 27, 29, and 30 are selected to represent data quartets because they have the dual characteristic of meeting the leading/trailing zeros constraint and the 10 percent maximum cumulative DC deviation from nominal center.

(b) Code points 19, 22, and 28 also meet the leading/-trailing zeros constraint and have an individual code point WXYZ= −20−. When used with the previously assigned thirteen patterns, these patterns will yield no more than three consecutive zeros in an arbitrary data quartet sequence. These code points are also unique in that, while they have individual DC component characteristics of 20%, they have a self-corrective property such that two used together, or in the same message frame, automatically compensate for each other to yield a 0% DC component deviation. Proof of this can be obtained using the introduced WXYZ model shown in FIG. 11. As previously discussed, it is assumed that time constants of the physical media interface are sufficiently large so as to coast over individual 30% deviation code points. As a practical matter, time constants are picked to be large enough to compensate for all dynamic duty cycle perturbations, and these described code sequences will compensate in all steady state conditions.

In accordance with one aspect of the invention system protocols are established which require certain control function codes and, after assignment of code points to the data quartets, nine of the remaining code point values are assigned to these function codes so as to meet the code constraints discussed above. The function codes may be summarized as follows.

STARTING DELIMITER A Starting Delimiter (SD) is used to delineate the starting boundary of a data transmission sequence. The data transmission may begin when the transmission medium is in the idle state or it may succeed or preempt a previous transmission. A Starting Delimiter may occur at any point regardless of previously established code group boundaries, such as in the case where a new transmission preempts a previous transmission, thereby terminating it.

The Starting Delimiter comprises a sequential code bit string of 11000 10001, that is, a sequential (24) (17) code point pair identified as JK in FIG. 12A. The two possible waveforms for the code point pair are illustrated at 1314 and 1318 (FIG. 13). The operative element of this sequence is the 9-bit string 100010001. The code points are chosen such that this 9-bit sequence does not exist in any other legal sequence of code points, independent of code group boundary synchronization. Because of this characteristic this sequence is used to establish code group boundaries. The Starting Delimiter JK is detected by the line state detection logic 813 as a unique 10-bit pattern, and when detected it resets or restarts the counter in logic 815. As the counter cycles it produces the code group and data group signals 912 and 914 so that on successive cycles J and K are decoded and fed to control register 825 and on further cycles application dependent data is decoded and entered into register 824 or 825. The contents of registers 824 and 825 are fed to the communicating entity at the station where the decoder is located and the communicating entity may utilize the data and control codes, or in some applications repeat it on the medium 442 as previously described.

From FIGS. 12A and 12B it is seen that several sequential code point pairs could be selected which would result in the 7-bit sequence 0001000. Only two pairs, (24)(17) and (17)(03) have the combined characteristics of no DC component, maximum number of code bit ones, and a leading and trailing code bit one. These latter characteristics are necessary to maintain the code constraint of no more than three consecutive zero bits between successive one bits. Referring again to FIG. 12A, the sequence (24)(17) is picked because it has two leading one bits, and will tend to maximize one bits in certain sequences such as after data code points containing two trailing code zeros, as shall be discussed. Although each code point of the Starting Delimiter has a DC deviation of 30%, the deviations are in opposite directions and thus balance each other out over the two code point intervals.

ENDING DELIMITER The Ending Delimiter function is used to terminate all normal transmissions. An Ending Delimiter is not necessarily the the last code point of the transmission since it may be followed by another Ending Delimiter and/or Control Indicators as described below. In the preferred embodiment the Ending Delimiter is assigned code point 13, as shown in FIG. 12B. It is detected in control register 825 after the code group boundary is established by the Starting Delimiter sequence.

The Ending Delimiter normally follows data quartets but this may not be true for all types of applications. As previously explained, the data quartets may produce individual code points having a WXYZ=−20−. Because the Ending Delimiter code point (13) has a WXYZ=+20−, a two code point sequence having a 20% DC component deviation from nominal may result when it is preceded by a −20− data code point. However, as described below, Ending Delimiters and optional control indicators are used in balanced pairs. When a particular application does not employ control indicators, the Ending Delimiter sequence consists of the code point pair (13)(13). The DC component deviations of the two code points of the Ending Delimiter pair balance each other so that the average deviation over the two code points is zero.

CONTROL INDICATORS Control Indicators are a series of sequential control codes which may optionally be used to indicate logical conditions which can be altered by repeaters without altering the data being transmitted, as required by a specific application protocol. Examples of usage include the transmittal of status conditions such as "error detected", "address recognized", or "frame copied".

As shown in FIG. 12B, the code point (07) is used to denote a logical Reset (off) when used for these status conditions, and the code point (25) to denote a logical Set (on). One or more control indicators may sequentially follow the Ending Delimiter (13) code point. They are detected in control register 825 after the code group boundary is established by the Starting Delimiter sequence.

Depending on the application, the Control Indicator sequence normally follows an Ending Delimiter. As shown in FIG. 11, the Ending Delimiter and Control Indicator code points (13), (07) and (25) share the WXYZ value +20−. Any arbitrary sequence of an even number of these code points will be balanced. An Ending Delimiter followed by an odd number of Control Indicators is a balanced sequence; however, an Ending Delimiter followed by an even number of Control Indicators is balanced by adding a final Ending Delimiter. Thus a balanced sequence of Ending Delimiters and Control Indicators is always possible, even when individual Control Indicators are altered "on the-fly" by repeating stations. As shown in FIG. 12B, the preferred assignment of code points for the Control Indicators honors the three consecutive zeros rule and also minimizes the probability of one Control Indicator value being mistaken for the other due to transmission noise.

QUIET. "Quiet" is defined herein to mean that condition of no activity on the transmission medium. This condition may exist as a result of units powered down, faults, or as a normal operating condition as dictated by unique application criteria. By the very nature of this condition, quiet must be represented as the absence of AC switching, as illustrated by waveform 1310 in FIG. 13. Thus it violates the run length and DC balance criteria of the code. Occurrence of the Quiet condition preempts any existing data transmission, thereby abnormally terminating it.

The Quiet condition is represented by the code point (or consecutive code points) 00000. The Quiet condition may be entered from any other condition. It is detected by the line state detection logic 813 as a consecutive 10-bit string of zeros. When the line state detection logic 813 detects the Quiet condition it may produce output signals over leads (not shown) to control the receiving communicating entity. After the Quiet condition has been entered, any additional number of consecutive zero bits may occur without regard to previously established code group clock boundaries. Depending on the application the group sync logic 815 may be disabled (i.e. decoding stops) or it may continue running, producing successive Quiet symbols in control register 825. Thus, the Quiet condition may, in some applications, be sensed in control register 825 in addition to, or instead of, being sensed by the line state detection logic 813. The only legal interface conditions which may follow Quiet are the Idle and Halt conditions subsequently described. In practice, a change of condition from Quiet to Idle or Halt may be masked out by the receiving station. This will allow time for AC signal stabilization in the receiver and, in the case of Idle, lock-in of the associated clock recovery circuitry, during which time the medium may appear (to the receiver) to be in an intermediate state. Thus, in some applications the line state detection logic may produce an output signal which blocks output 912 from the group sync circuit 815. Register 818 holds the Quiet code so the decoded value for Quiet is repeatedly read out to control register 825 and this is continued until line state detection logic 813 detects a new valid pattern.

IDLE. The "Idle" condition is defined herein to represent the continuous fill of ones on the physical medium. This state normally is entered from the Quiet or Halt conditions or after normal data transmission and is used to capture or maintain bit clock synchronization in the receiver logic. The Idle condition is represented by the code point (or consecutive code points) 31 (11111). It is detected by the line state detection logic 813 as a consecutive 10-bit string of ones and results in output signals to control the receiver. Once the idle condition has been entered, any additional number of consecutive ones may occur without regard to previously established code group clock boundaries. Depending on the application the code group sync logic 815 may be disabled (i.e. decoding stops) or it may continue running, producing successive Idle symbols in control register 825. The nature of the Idle condition is that it appears on the physical medium as a periodic waveform whose frequency is inversely related to twice the code bit cell time, as shown by waveform 1312. Occurrence of the Idle condition preempts any existing data transmission, thereby abnormally terminating it.

HALT. The serial interface for certain system configurations optionally requires the function of a forced jam on the interface medium, which precludes normal signal reception by other receiving nodes, and conveys a logical break condition. This condition is herein defined as "Halt", and may be used as part of contention resolution sequences, network reconfiguration sequences, or other such functions. Halt is assigned code point (or consecutive code points) 04, or 00100. It is detected by the line state detection logic 813 as a consecutive string of at least four but less than ten zeros. Halt may be used singularly or repetitively as dictated by the individual serial transmission protocol. Depending on the application the group sync logic 815 may be disabled (i.e. decoding stops) or it may continue running, producing successive Halt signals in control register 825. Although Halt is always transmitted as code point 04, if it is decoded into control register 825, code points 01, 02, 08 and 16 (discussed below) must also be decoded as Halt rather than as invalid code points, since code group synchronization cannot be guaranteed in this state. Each of the code points 01, 02, 08, and 16, like the Halt code point 04, has only one binary bit and without synchronization the code points can't be distinguished. Consistent with the nature and purpose of the Halt condition, note that the three maximum consecutive zero code bit characteristic is violated as shown by waveform 1316. Occurrence of the Halt condition preempts any existing data transmission, thereby abnormally terminating it.

It should be noted that the Halt code, establishes a break, jam or invalid condition on the medium without having to continuously transmit an invariant or steady signal. In the prior art where, for example, a bus is forced high to, in effect jam the bus, the high level signal has a 100% duty cycle which could burn out or damage components in the medium interface circuits 416, particularly if those components are LEDs where the optimum duty cycle is 50%. By using the Halt code (50% duty cycle) logical break or jam can be established without the danger of burning out or damaging the components in the medium interface circuits. Furthermore, by using the Halt code it is possible to distinguish between a jam on the medium and the condition where a driver in the medium interface 416 sticks in the "on" state.

INVALID CODE POINTS. All remaining code points are "Invalid" and are not used in this embodiment because of undesirable consecutive zero or DC component characteristics. The invalid code points are 01, 02, 03, 05, 06, 08, 12 and 16. However, as noted in the preceding paragraph, in some applications it is necessary to store the Halt code in ROM 820 at each of the locations addressed by code points 01, 02, 08 and 16.

The valid code points and their assignment to both control codes and data quartets of the 4-bit code determine the values which are stored in the ROMs 516 and 820. The 5-bit binary codes listed in column 2 of FIG. 12A are stored in ROM 516 so that when a 4-bit binary quartet (Col. 5 of FIG. 12A) is applied to it the corresponding 5-bit binary value is read out. ROM 820 stores the 4-bit binary values of the data quartets at the addresses which are read when the 5-bit binary values are applied as addresses.

It will be noted that the code point assignment shown in FIGS. 12A and 12B does not indicate the 4-bit code for the delimiters, control indicator or line states. Any 4-bit value may be assigned to each of these code points. The signal on lead 508 will distinguish a data quartet from a control function quartet at the encoder, and the indicator stored with each control code in ROM 820 will distinguish an output quartet from the ROM as either a data quartet or a control function code.

System Protocols

A code constructed in accordance with the principles of the present invention and having provision for Start and End Delimiters, Quiet, Halt and Idle control codes as well as data quartets and Control Indicators provides all the coding requirements for controlling and communicating between two or more stations whether they be interconnected point-to-point, or by a bus, or in a star or ring configuration. The protocols, the allowable system states and the sequences in which these states may occur vary for the different system configurations in which the stations may be interconnected. FIGS. 15-18 are state diagrams for transmitters connected in various system configurations as subsequently described. In these diagrams a Q designates the Quiet state during which a station receives the Quiet signal illustrated by waveform 1310 of FIG. 13. The Quiet signal is detected at a receiving station when the transmitting station is turned off. During the Halt (H) and Idle (I) states the transmitter transmits the Halt and Idle signals 1316 and 1312, respectively. The addressing of stations is not considered herein since, as is well known in the art, address recognition circuits may be provided in each communicating entity 410 if the system includes more than two communicating entities or is not connected in a point-to-point configuration.

FIG. 1 is a block diagram illustrating a prior art duplex point-to-point communication system wherein a first station includes a transmitter 110 and a receiver 112 and a second station includes a transmitter 116 and a receiver 114, the receiver 114 being connected to transmitter 110 by a transmission medium 118 and the transmitter 116 being connected to the receiver 112 by a transmission medium 120. FIG. 15 is a state diagram for a transmitter in the system.

In the system of FIG. 1, there can never be any contention between transmitters for a medium. Therefore, when a station is turned on its transmitter enters the Idle state shown in FIG. 15 and begins transmitting the Idle waveform 1312 in order to bring the phase locked loop or clock recovery circuit in the receiver into synchronism with the transmitter. At power turn-on, the transmitter transmits the Idle signal for at least some fixed interval such as, for example, 64-bit intervals to insure that synchronism is established. After synchronism is established the transmitter continuously switches between the Idle and Active (A) states. If a transmitter is in the Idle state it may switch to the Active state and transmit a Starting Delimiter (SD) sequence followed by the data to be transmitted. When the transmitter completes transmission of the data it transmits an Ending Delimiter and possibly one or more Control Indicators (collectively represented as "Done" in FIG. 15) and returns to the Idle state until it has more data to send at which time it transmits another Starting Delimiter followed by the data.

When in the Active state a transmitter of FIG. 1 may concatenate transmission sequences, or terminate a transmission sequence and begin a new sequence, by transmitting the Starting Delimiter, as indicated by the circular SD loop at 1714. Transmission sequences bounded by Starting and Ending Delimiters may be transmitted without returning to the Idle state. A transmitter returns to the Halt state only from the Idle state and this change of state is used to signal a logical break in the connection. Halt is typically used to interrupt the other station in a manner analogous to the break function in modem systems.

FIG. 2 illustrates a system wherein the transmission medium is a bus. A plurality of stations are connected to the bus with each station comprising a transmitter and a receiver. The system includes transmitters 210, 216 and 218 and receivers 212, 214 and 220 interconnected by a transmission medium or bus 234. In such systems a transmitter at any station may transmit to a receiver at one or more other stations. Since two or more transmitters may wish to transmit at the same time, they might contend for control of the bus. There are, in general, two ways to resolve the contention problem.

The first way of resolving the bus contention problem allows for the possibility that multiple transmitters may attempt overlapping transmissions on the bus. In this method, conforming to IEEE Standard 802.3 (CSMA/CD) the transmitters wishing to transmit are permitted to begin transmission on the bus. Each transmitting station also monitors the bus for collisions. If two transmissions are received simultaneously, an invalid code sequence is detected by a Halt (H), Quiet (Q) or Invalid (V) code in register 825, by line state detection logic 813, or by other means in the receivers in the transmitting stations which, through their associated transmitters and in accordance with one novel aspect of the present invention, place Halt sequences on the bus to ensure that all other stations detect the collision. The Halt sequences placed on the medium by one or more transmitters may overlap at some point in time so that the effective signal on the medium will be detected as 10 or more consecutive zeros (Quiet) which is also invalid while transmitting. Since a station monitors its own transmission a receiver should never receive Halt, Quiet or invalid codes while its associated transmitter is transmitting except in the case of a collision. As each receiver recognizes the jammed or invalid condition of the bus it causes its associated transmitter to become logically Quiet. After all stations are logically quiet a timing arrangement then grants bus access to one of the transmitters.

FIG. 17 shows the transmitter state diagram for the bus contention system just described. When a station is turned on its transmitter enters the Quiet (Q) state. After Quiet is established a transmitter wishing to transmit places the Idle sequence on the bus to synchronize the clock recovery circuit at the receiver(s) to the transmitter. The Starting Delimiter is then transmitted followed by the data transmission during the Active State. At the conclusion of the Active state the transmitter returns to the Quiet state. However, if the last code point transmitted should end at the high level, the signal transition from the high level to Quiet (all zeros) will be interpreted as a binary 1 which, when followed by consecutive zeros in the Quiet sequence results in a single false Halt. Thus, the transmitter may actually transmit a single false Halt code after a transmission and before returning to the Quiet state.

The transmitter will switch to the Halt state in case of a collision as described above. Due to bus delay, the collision may actually occur between the idle from one transmitter and the idle or data from another transmitter. Therefore, a transmitter may enter the Halt state from either the Idle or Active state. The transmitter will remain in the Halt state long enough to jam the entire length of the bus with the Halt signal, then return to the Quiet state.

The second way of solving the bus contention problem is to prevent actual collisions by providing an explicit or implicit "token" which is merely an indicator that the station holding the token has control of the bus. An explicit token is a signal which is passed on by a transmitter when it has completed its transmission. This may be done by transmitting another SD followed by the signals representing the token. When a station has the token it may transmit. An implicit token can be any timing (time slot assignment) or sequence addressing information which provides an indication of which transmitter has completed a transmission. After the indicator occurs, a transmitter waits a certain amount of time and if no other station has started to transmit the transmitter assumes that it may proceed. The wait time can be based on the bus propagation delay. Thus, in a bus system with an implicit token, a transmitter stops after completing its transmission. After a fixed delay a given second transmitter assumes it has the token and begins transmission. If the second transmitter has no data to transmit it does nothing and after another fixed delay the next transmitter assumes that it has the token and so forth. The standards for explicit token buses are set forth in IEEE Standards 802.3 - Token-Passing Bus Access Method and Physical Layer Specifications. A proposed standard for implicit token buses is presented in ANSI X3T9.5LDDI (Local Distributed Data Interfaces).

FIG. 18 is a state diagram for a transmitter in a token bus system, the token being either explicit or implicit. When a station is turned on its transmitter enters the Quiet state when it is turned on because at this time it does not know if it has data to transmit and may not have the token. When it does have data to transmit, and has the token, it enters the Idle state and transmits a preamble, sync burst, or sync pattern in the form of the Idle waveform 1312 lasting over a sufficient interval (say 64 bits) to synchronize the clock recovery circuits at the receivers to the transmitter clock. After the transmitter has transmitted the Idle signal it switches to the Active state and transmits a Starting Delimiter, one or more frames of data, an Ending-Delimiter and Control Indicators as required by a specific application. The transmitter then shuts off or returns to the Quiet state. However, if the last signal transmitted is at the high level a transition occurs when the transmitter is cut off, thus falsely indicating a binary one. The Quiet sequence is all zeros. Thus, a sequence which corresponds to a single false Halt code (10000) may appear on the bus. After the Halt occurs, the transmitter enters the Quiet state until such time as it has other data to send and has control of the bus.

FIG. 3 shows a plurality of stations interconnected in a loop or ring configuration. The stations each include a transmitter (310, 316, 318, 322) and a receiver (312, 314, 320, 324). Transmission media 326, 328, 330 and 332 interconnect the stations so that the transmitter of one station is connected to the receiver of the next station. If one transmitter, for example transmitter 310, wishes to transmit to a receiver, for example receiver 320, it places the message on medium 326 where it is received at receiver 324. The message is then repeated or retransmitted by transmitter 322 to the receiver 320. Access to the loop or ring may be controlled by token passing or it may be a slotted or insertion ring.

A loop or ring configuration like that shown in FIG. 3 may be continuously clocked by a central clock located at one of the stations or by a distributed clocking mechanism in more than one of the stations. This is sometimes referred to as closed loop clocking. Thus, the transmitter(s) of the clock station(s) will alternately transmit Idle (clock) or data (from which the clock may be recovered). As soon as a data transmission is completed, a transmitter returns to Idle and may immediately transmit another Starting Delimiter and again initiate the Active state since it is known that the receiver is already synchronized. Thus, a ring configuration with closed loop clocking acts just the same as a point-to-point configuration and its states are illustrated by the state diagram of FIG. 15. A transmitter returns to the Halt state only from the Idle state and this change of state is used to signal a logical break in the connection. When a receiver detects Quiet on the medium it causes the associated transmitter to signal Halt. When the break is terminated the transmitter returns to the Idle state. This signalling sequence is useful for dynamic ring configuration.

A loop or ring configuration like that shown in FIG. 3 may also be clocked intermittently by the station(s) which are initiating data transmissions on the loop or ring, sometimes referred to as open loop clocking. Each station capable of initiating a transmission on the loop or ring includes clock recovery and clock generating means. With this type of clocking a station initiates clocking of the loop or ring when it initiates a transmission. This requires that when a station is repeating a transmission it has to first lock onto the clock of the preceding transmitter on the loop or ring. Thus, while an open loop clock may be simpler to build it has the disadvantage of causing additional delay in each station. Also a new sync burst must be sent from each station and there must be time allowed for the receiver at the next station to lock onto the clock from the preceding station.

Referring to the state diagram of FIG. 16, when a station is not doing anything else, it continuously transmits the Halt signal. When a station receives a sync burst from the preceding station it has to send out a sync burst (Idle) to the next station. Because the previously transmitted Halt sequence has already balanced the DC level, the sync burst need only be long enough to sync the receiver at the next station. Once the sync burst has been transmitted the transmitter then transmits the Starting Delimiter and enters the Active state to transmit the data it has to send, or repeat the data it receives. After a data transmission the transmitter switches back to the Halt state. A break in the link between a transmitter and the preceding station on the ring also causes the transmitter to switch to the Halt state, as in closed loop clocking.

FIG. 14 is a state diagram illustrating the possible states and state changes of a receiver. A receiving entity enters the Quiet state when it is turned on. From this state it may proceed to either the Idle or Halt state depending upon the control signals it receives. From the Idle state the receiver enters the Active state when it receives a Starting Delimiter. The Halt state may be entered from any other state. At the end of a transmission the receiver may enter the Quiet state or, if the signal level is at the high level when shutoff occurs a false Halt code, generated as described with reference to FIGS. 17 and 18, may cause the receiver to pass through the Halt state before it enters the Quiet state. The only constraint on the receiver is that it can enter the Active state only from the Idle state.

It should be understood that the system configurations and transmitters and receivers illustrated in FIGS. 1-3 are well known in the art. The present invention relates to a novel code and encoding/decoding means for implementing said code, the encoding/decoding means interfacing the transmitters and receivers to a transmission medium to transmit both data and control codes in a manner which is self-clocking, results in low DC component deviation from nominal, and is highly transfer rate efficient, the control codes permitting control of a variety of system configurations.

While a specific preferred embodiment has been described in detail it will be understood that various modifications and substitutions may be made in the disclosed embodiment without departing from the spirit and scope of the invention. For example, it will be noted that Data Quartet assignment to the sixteen data code points is purely arbitrary. Furthermore, a second and equally valid code may be evolved by reversing the leading/trailing zeros restriction of the data code points. Also, similar valid codes exist using WXYZ = +20− codes for data and WXYZ = −20− codes for control functions. It is intended therefor to be limited only by the scope of the appended claims.

The embodiments of the invention in which an exclusive property or privilege is claimed are defined as follows:

1. A media independent system for encoding data for transmission over a serial transmission medium, said system comprising:
    (a) first means for receiving and storing signals representing multiple bit data groups;
    (b) second means for receiving and storing signals representing multiple bit control groups;
    (c) third means coupled to said first and said second means for receiving and multiplexing said data groups and said control groups;
    (d) encoding logic means coupled to said multiplexing means and responsive to sequentially received signals representing data and control groups for sequentially providing signals representing encoded control and data groups;
    (e) means coupled to said encoding logic means for converting said signals representing encoded control and data groups into a sequence of serial signals in NRZI format which may be applied to a transmission medium.

2. The invention as set forth in claim 1 wherein said encoding means is a parallel storage means having $2^{m+1}$ addressable locations of n bits each, n being greater than m, where m is the number of bits in a data or control group and n is the number of bits in an encoded data or control group.

3. A run-bounded self-clocking coding system for serial interfaces using a group coding technique and an m/n rate NRZI code, said system having a decode structure comprising:
    (a) code bit converting means for receiving a serial string of coded bits representing data and control signals;
    (b) a shifting storage means connected to said converting means for serially receiving and temporarily storing the converted code bits and simultaneously providing at parallel outputs a plurality of said converted bits;
    (c) a first logic means connected to said shifting storage means to simultaneously receive and store the contents thereof;
    (d) decoding means connected to said first logic means for simultaneously receiving the coded contents thereof and simultaneously producing a plurality of decoded output bits and an indicator, said indicator indicating whether said decoded output bits represent data or control signals;
    (e) a second and a third storage means connected to said decoding means for receiving the decoded output bits and indicators from said decoding means, said second means being responsive to an indicator for storing decoded output bits representing data and said third storage means being responsive to an indicator for storing decoded output bits representing control signals.

4. The run-bounded self-clocking coding system as set forth in claim 3 wherein said first, second and third storage means are storage registers and said third storage means is a register having twice the capacity of said second storage register.

5. The run-bounded self-clocking coding system as set forth in claim 4 wherein said decoding means is a read only memory.

6. The run-bounded self-clocking coding system as set forth in claim 5 wherein said read only memory is a ROM having addressable locations, each location of which stores a four-bit decoded information segment.

7. Encoder means for encoding m-bit binary values in a first code into n-bit binary values in a second code comprising:
    logic means responsive to signals representing m-bit binary values in said first code for producing signals representing m-bit binary values in said second code, n being greater than m; and,
    converter means responsive to said logic means for converting said signals representing said n-bit binary values into a serial sequence of signals in NRZI format,
    said logic means comprising means responsive to said signals representing a sequence of said m-bit values for generating only n-bit binary values such that a sequence of said signals representing said n-bit binary values never contains more than three consecutive zero bits and said sequence of signals representing said n-bit binary values, when converted to NRZI signal format by said converter means has a d.c. component which does not vary from a nominal level by more than 20% over the interval required to signal one of said n-bit binary values.

8. Encoder means as claimed in claim 7 wherein m=4 and n=5.

9. A method for designing a second code for the transmission of serial binary data manifested in a first code, said first code having $2^m$ possible values each capable of being represented by m binary bits, said method comprising:
    selecting a value n where n is greater than m, $2^n$ representing the number of possible values in said second code each value capable of being represented by n bits;
    determining the NRZI waveform for each of the possible values in said second code when the n bits representing each value in said second code are converted to NRZI;
    determining from said NRZI waveforms figures of merit which indicate the DC deviation from a nominal level of electrical signals corresponding to said waveforms;

21 assigning the $2^m$ possible values in said first code the $2^m$ values of said second code which correspond to the NRZI waveforms having the smallest figures of merit.

10. The method as claimed in claim 9 wherein a value representing said second code is assigned to a value represented in said first code only if the value represented in said second code does not contain a predetermined number of consecutive binary zero bits, said predetermined number being small enough to permit self-clocking of signals representing data in said second code.

11. The method as claimed in claim 10 wherein the values in said second code which are assigned to values in said first code are chosen such that over any sequence of values in said second code the number of consecutive binary zero bits does not exceed said predetermined number.

12. A method of transmitting binary data originally manifested in a first code, said first code having $2^m$ possible code values each represented by m binary signals, said method comprising:

selecting a second binary code having $2^n$ possible code values each represented by n binary signals, n being an integer greater than m;

representing each of said $2^n$ code values by its equivalent NRZI waveforms;

determining the DC signal deviation from a nominal value for an electrical signal corresponding to each of said NRZI waveforms;

selecting from said second code values only those code values which, in a serial binary sequence of code values, will have no more than a predetermined number of consecutive binary zeros;

from said selected code values choosing the $2^m$ code values whose corresponding NRZI waveforms have the lowest DC deviation from said nominal level;

assigning each of said chosen code values to a corresponding one of the code values of said first code;

providing an encoding means which is responsive to each value in said first code for producing its corresponding value in said second code;

converting each value produced by said encoding means into a serial sequence of signals in NRZI format; and, applying said NRZI signals to a transmission medium.

13. A method as claimed in claim 12 wherein the step of providing an encoding means comprises providing a memory means with a plurality of addressable storage locations, said memory storing at each addressable location one of said chosen code values which is read out when its corresponding value in said first code is applied to said memory means.

14. A method as claimed in claim 13 where $m=4$ and $n=5$ and the maximum DC deviation of the NRZI signals from said nominal level over the interval required to signal one code value in the NRZI format is 20% of the nominal level.

15. In a serial data transmission system having a plurality of communicating entities located at a plurality of stations and a transmission medium interconnecting said stations, each station including encoding means responsive to data and control signals in a first m-bit code for applying signals in a second n-bit code in NRZI format to said transmission medium, n being an integer greater than m and decoding means responsive to said signals in

22 said NRZI format on said transmission medium for reproducing said data and control signals in said second code, the improvement wherein:

said encoding means comprises first means for encoding certain of said control signals into pairs of n-bit codes and second means for converting said pairs of n-bit codes into paired sequences of NRZI signals whose DC deviation from a nominal level over the duration of a paired sequence is always zero.

16. The improvement as claimed in claim 15 wherein each communicating entity includes a transmitter and a receiver and said control signals issued by a given transmitter to said encoding means designate the transmitter states of Idle and Halt, said encoding means being responsive to an Idle control signal for generating an NRZI signal sequence comprising a continuous sequence of binary ones and responsive to said Halt signal to generate a sequence of NRZI signals having more than three binary zeros between consecutive ones, said transmitter having an active state which is manifested by outputting to said decoder a Starting Delimiter followed by data.

17. The improvement as claimed in claim 1 wherein each transmitter has a Quiet state, said encoding means being responsive to said transmitter for producing a sequence of NRZI signals comprising all binary zeros.

18. The improvement as claimed in claim 16 wherein said transmission medium interconnects said stations in a point-to-point configuration.

19. The improvement as claimed in claim 17 wherein said transmission medium is a bus interconnecting said stations.

20. The improvement as claimed in claim 17 wherein said transmission medium interconects said stations in a loop or ring configuration.

21. The improvement as claimed in claim 15 wherein $m=4$ and $n=5$ and wherein said encoding means encodes into m-bit codes such that a sequence of NRZI signals converted from said m-bit codes never contains more than three consecutive binary zeros unless the sequence contains an indication of a Halt.

22. A method as claimed in claim 12 where $m=4$ and $n=5$ and the NRZI signals corresponding to said chosen code values have an individual DC deviation of not more than 10% from said nominal level or have individual DC deviations from said nominal level greater than 10% which balance each other when a pair of them are signalled in sequence.

23. In a serial binary data transmission system wherein a plurality of stations are interconnected by a medium in a configuration such that the signals representing a transmission of data and control codes from a first of said stations to a second of said stations may pass through one or more intermediate stations, each of which may modify one or more control indicators in the transmission passing through it, a method of limiting the DC deviation of the transmitted signal from a nominal level, said method comprising:

assigning to said control indicators and an ending delimiter code values having an odd number of binary ones such that a pair of said code values, when transmitted as an NRZI signal on said transmission medium, exhibits zero DC deviation from a nominal level over the interval required to signal said pair of code values;

transmitting a first ending delimiter after a sequence of data has been transmitted;

transmitting any control indicators or modified control indicators; and, transmitting a further ending delimiter only if the number of control indicators transmitted is even, whereby the total number of ending delimiters and control indicators is always an even integer.

24. The improvement as claimed in claim 15 wherein said encoding means includes means for encoding a starting delimiter as one of said pairs of n-bit codes, said starting delimiter defining a starting boundary for data, said system further including, at each of said stations, a decoder means;

clock recovery means responsive to said signals on said transmission medium for producing clock pulses;

sync logic means responsive to said clock pulses for controlling said decoder means;

converter means for converting NRZI signals received from said transmission medium into binary code signals;

register means connected to said converter means for storing said binary bits; and, means responsive to said register means for restarting said sync logic means when binary code signals representing said starting delimiter are detected in said register means.

25. In a data transmission system having a plurality of stations interconnected by a transmission medium, a method of forcing a break signal onto the medium comprising transmitting signals representing Halt code points for an interval of time sufficient to propagate the signal representing at least one of said Halt code points the length of said transmission medium, said Halt code points being such that the the signals representing them each have a 50% duty cycle, and, after said interval of time terminating said signal.

26. In a data transmission system having a plurality of stations and a transmission medium interconnecting said stations, each station including a receiver for receiving signals placed on the medium by a preceding station and a transmitter for transmitting signals over said medium to a succeeding station, a method of maintaining DC balance in said receivers even when there is no clocking signal on said medium, said method comprising operating each of said transmitters to transmit a signal, representing a multi-bit signal code and having a 50% duty cycle, during intervals when the transmitter has no data to transmit.

* * * * *

UNITED STATES PATENT AND TRADEMARK OFFICE
CERTIFICATE OF CORRECTION

PATENT NO. : 4,530,088
DATED : July 16, 1985
INVENTOR(S) : James R. Hamstra and Robert K. Moulton It is certified that error appears in the above-identified patent and that said Letters Patent is hereby corrected as shown below:

Column 22, Line 35, "interconects" should be -- interconnects --.

Signed and Sealed this

Twenty-second Day of October 1985

[SEAL]

Attest:

DONALD J. QUIGG

Attesting Officer

Commissioner of Patents and Trademarks—Designate